(12) United States Patent (10) Patent No.: US 8,622,311 B2
Hamedani et al. (45) Date of Patent: Jan. 7, 2014

(54) COIN HAVING INTEGRATED RFID IDENTIFICATION DEVICE AND METHOD FOR THE PRODUCTION THEREOF

(75) Inventors: Soheil Hamedani, Grafing by Münich (DE); Gregor Innitzer, Vienna (AT)

(73) Assignees: Munze Osterrich AG, Vienna (AT); Soheil Hamedani, Munich (DE)

( * ) Notice: Subject to any disclaimer, the term of this patent is extended or adjusted under 35 U.S.C. 154(b) by 22 days.

(21) Appl. No.: 13/260,887

(22) PCT Filed: Mar. 29, 2010

(86) PCT No.: PCT/DE2010/000350
§ 371 (c)(1),
(2), (4) Date: Nov. 4, 2011

(87) PCT Pub. No.: WO2010/112002
PCT Pub. Date: Oct. 7, 2010

(65) Prior Publication Data
US 2012/0055996 A1   Mar. 8, 2012

(30) Foreign Application Priority Data

Mar. 30, 2009  (DE) .......................... 10 2009 015 579

(51) Int. Cl.
*G06K 19/06* (2006.01)

(52) U.S. Cl.
USPC .......................................................... 235/492

(58) Field of Classification Search
USPC .................................................. 235/379, 492
See application file for complete search history.

(56) References Cited

U.S. PATENT DOCUMENTS

| 7,918,455 | B2 * | 4/2011 | Chapet et al. ............. 273/148 R |
| 2004/0026520 | A1 * | 2/2004 | Kawai et al. .................. 235/492 |
| 2006/0003842 | A1 | 1/2006 | Kakinuma et al. |

FOREIGN PATENT DOCUMENTS

| JP | 2008033716 A | * | 2/2008 |
| WO | 96/18173 |  | 6/1996 |

* cited by examiner

*Primary Examiner* — Seung Lee
(74) *Attorney, Agent, or Firm* — Daniel A. Thomson; Emerson Thomson Bennett, LLC

(57) ABSTRACT

The invention relates to a coin comprising a preferably disk-shaped metal base element (2) and at least one flat insert element (4), which is received in the disk-shaped metal base element (2). Advantageously, the flat insert element (4) is made of a non-conductive material, preferably plastic, and at least one RFID identification device (5) is provided in the flat insert element (4).

16 Claims, 2 Drawing Sheets

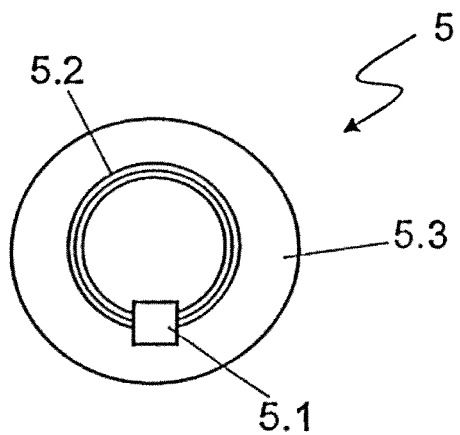
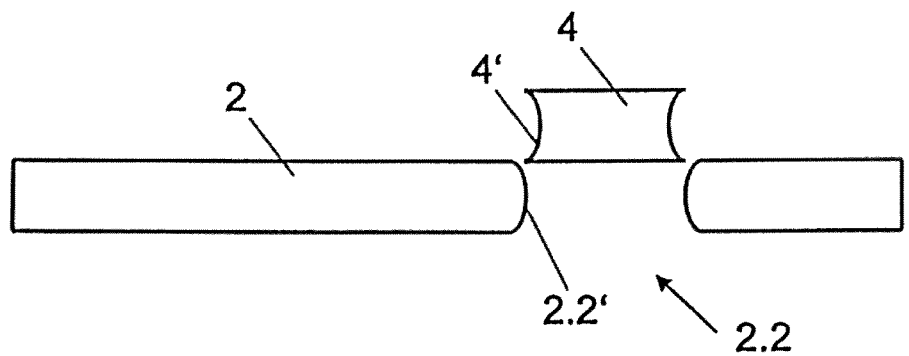
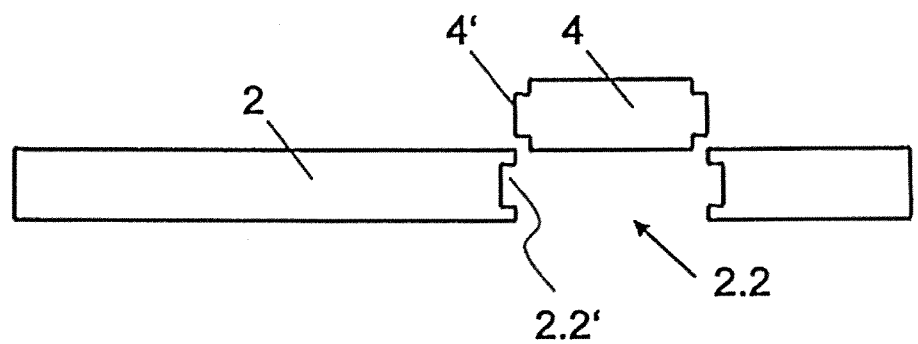

COIN HAVING INTEGRATED RFID IDENTIFICATION DEVICE AND METHOD FOR THE PRODUCTION THEREOF

The invention relates to a coin according to the preamble of claim 1 and method for the production of such a coin.

In the currencies of various countries, coins are used as means of payment and usually feature an embossment. Such coins are manufactured from at least one disk-shaped blank or base element of metal or a metal alloy.

Coins are also known that consist of at least two parts, namely one ring-shaped base element and one preferably disk-shaped central or core element. The aforementioned coin elements can be manufactured for example from different metal materials to achieve a special visual appearance of the coins. Single specimens of such coins meanwhile have a monetary value that far exceeds the material value of the respective coin, so that measures are necessary for identifying such coins or for verifying that they are genuine.

Also known are contactless identification systems for the identification and tracing of movable objects, the systems being permanently connected with the object to be identified. RFID identification systems are frequently used for this purpose, which essentially make use of RFID technology for the transfer of data. The acronym RFID stands for "Radio Frequency Identification."

Classic RFID systems consist of a stationary or mobile RFID scanner and an RFID transponder, which comprises an RFID chip that interacts with an antenna assembly. The RFID scanner also comprises an antenna assembly, by means of which an electromagnetic field is generated. If the antenna assembly of the RFID transponder enters the electromagnetic field of the RFID scanner, an inductive signal coupling between the RFID scanner and the RFID transponder occurs. Attenuation modulation of the electromagnetic field produced by the RFID scanner achieves at least a directional data transfer, especially of identification information from the RFID transponder to the RFID scanner. Such RFID systems operate for example at a frequency of 125 kHz to 13.56 MHz.

It is also possible to attach extremely flat, preferably passive RFID transponders, so-called "smart labels" to the surfaces of objects made of plastic. It becomes problematic, however, when such passive RFID transponders are operated in the immediate proximity of electrically and/or magnetically conductive materials, especially conductive surfaces with at least a significant metal content, since the magnetic alternating flow in the electrically and/or magnetically conductive material induces eddy currents, which cause the electromagnetic field generated by the RFID scanner on the surface of the respective object to be attenuated so strongly that the data transfer of the RFID transponder provided on the surface of the object is hindered so strongly that the reception of usable data by the RFID scanner is no longer possible. The shielding of such eddy currents poses a technical problem, which in the case of RFID technology is caused by the geometry of the antenna structure provided in the immediate proximity of the conductive layer. This problem can be solved by providing and suitably orienting a shielding layer consisting of highly permeable materials such as ferrites or special alloys between the antenna structure formed by at least one conductive loop and the metal surface of the object, to cancel the induced eddy currents to a large extent. Ferrite foils, for example, are already being used for shielding.

Based on the prior art, the object of the invention is to improve a coin to the extent that a simple and fast verification of the genuineness of the coin is possible, to reliably identify counterfeit coins and worthless copies. This object is achieved by the characteristics of the preamble of claim 1.

The essential aspect of the coin according to the invention is that the flat insert element received in the base element of the coin is manufactured from a non-conductive material, preferably plastic, and that at least one RFID identification device is provided in the flat insert element. In an advantageous embodiment, the RFID identification device consists of an RFID transponder.

In a further advantageous embodiment the at least one disk-shaped metal base element comprises at least one recess or hole for receiving the preferably disk-shaped flat insert element, the insert element forming a plastic casing for the RFID identification device. This effectively protects the RFID identification device or the RFID transponder during the identification process and during later use of the coin with the integrated RFID identification device.

The RFID transponder comprises at least one RFID chip and at least one antenna structure connected with said chip, the RFID transponder preferably being designed as a passive unit without its own energy supply. The RFID chip and the corresponding antenna structure can be advantageously applied to a base layer, for example a thin paper layer or plastic film and the RFID transponder can comprise at least one electrically conductive shielding layer for shielding the RFID chip and its antenna structure against eddy currents caused by the metal base element.

Further, the invention refers to a method for manufacturing a coin with an integrated RFID identification device from a preferably disk-shaped metal base element, in which especially advantageously a recess or hole is made in the base element and a flat insert element with an RFID identification device received in said insert element is inserted into the recess or hole and the flat insert element is pressed together with the base element.

The invention is described below based on exemplary embodiments with reference to the drawings, in which:

FIG. 3 shows a top view of a flat insert element with integrated RFID identification device;

FIG. 4 shows a cross section through a disk-shaped base element and corresponding flat insert element with concave and convex edge sections and FIG. 5 shows a cross section through a disk-shaped base element and corresponding flat insert element with tongue and groove sections.

Figure 1:
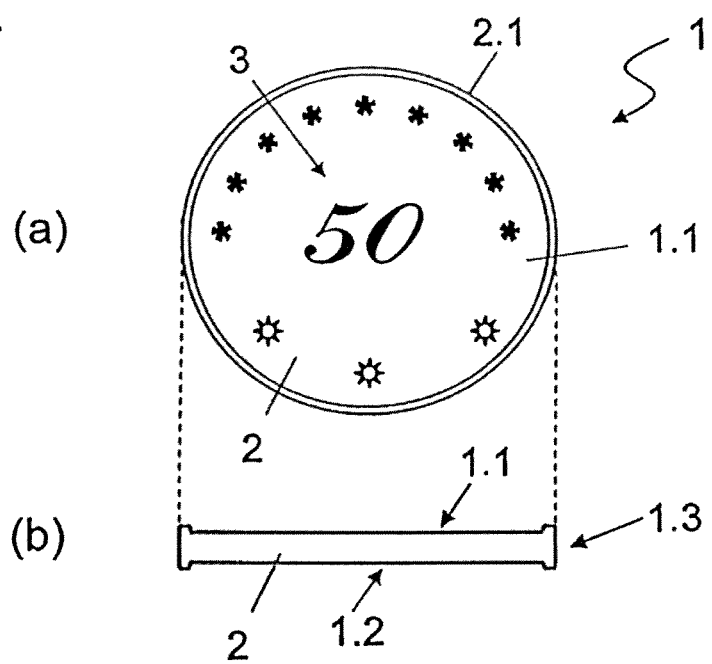
FIG. 1a shows a top view of a conventional coin.
FIG. 1b shows a cross section through the coin in FIG. 1.

FIG. 1(a) shows a top view of a coin 1 and FIG. 1(b) shows a cross section through the coin 1 according to FIG. 1(a), the coin being designed for use as a means of payment. Such coins 1 are sufficiently known in the prior art and are manufactured in a wide range of forms and shapes.

Such coins 1 used as means of payment normally consist of one or several parts and are made of an extremely stable material, namely of metal and/or of a metal alloy. They consist essentially of a disk-shaped base element 2 or in the case of multi-part coins 1 of a base element 2 and at least one further element received by said base element. A coin 1 normally comprises at least one front side 1.1, one reverse side 1.2 and one edge 1.3.

The coin 1 depicted in FIGS. 1(*a*) and (*b*) furthermore comprises an embossment 3 on the front and/or reverse side 1.1, 1.2 of the coin 1, by means of which for example a numeral indicating the value of the coin 1, a symbol, a picture or various decorative elements are applied to the front and/or reverse side 1.1, 1.2 of the coin 1. The principle of embossing coins is sufficiently known. In this process, a preferably metal coin blank in the form of a disk-shaped base element 2 is placed between an upper and a lower die, which respectively bear the negative of the motif to be embossed. The upper and lower die are pressed together so that the respective motif is embossed into the front and reverse side of the base element 2 of the coin 1. This reduces in particular also the thickness of the disk-shaped base element 2, and through the embossing process an outer ring 2.1 can be formed on the edge of the coin 1, which (ring) sticks out upward and downward from the front and/or reverse side of the coin 1 formed by the embossing and therefore forms the ring-shaped bearing surface of the coin 1.

The base element 2 of the coin 1 is preferably disk-shaped and flat in design. The at least one further element provided in the case of bimetal coins 1 can likewise be manufactured from metal or a metal alloy and is inserted into a recess or hole 2.2 provided in the base element 2, namely preferably in the center area of the coin 1. The base element 2 and the further element are bonded with each other or pressed together by plastic deformation under pressure. For example, the further element is pressed into the recess or hole 2.2 of the base element 2, preferably during a punch press process.

Figure 2:
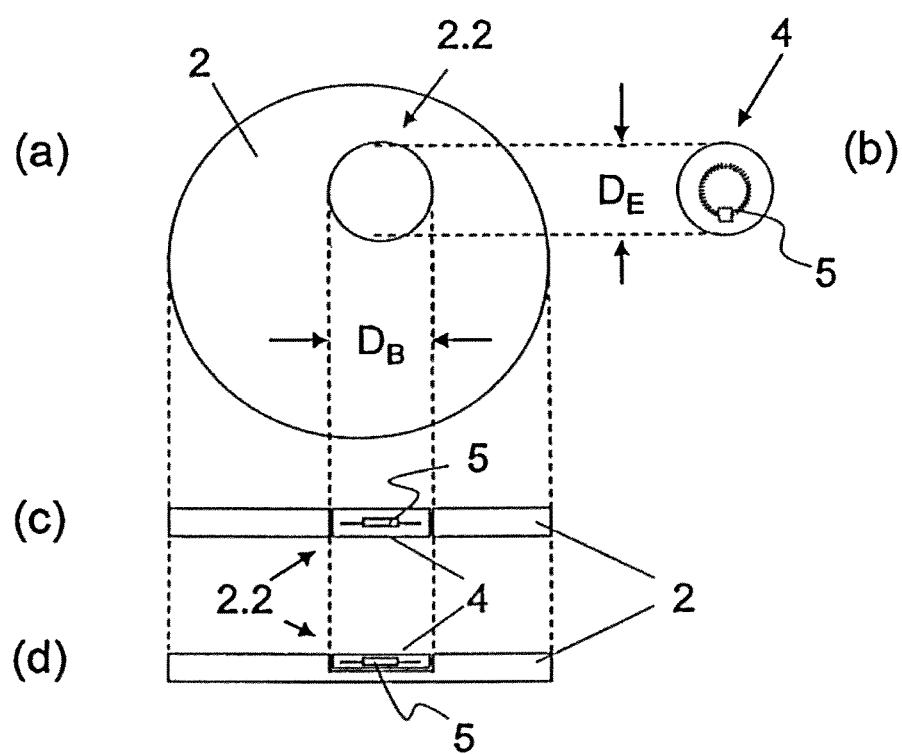
FIG. 2a shows a top view of a disk-shaped base element with a recess or hole.
FIG. 2b shows a top view of a flat insert element.
FIG. 2c shows a cross section through the disk-shaped base element with the flat insert element inserted into the hole.
FIG. 2d shows a cross section through the disk-shaped based element with the flat insert element inserted into the recess.

For the manufacture of a coin 1 according to the invention with an integrated RFID identification device 5, first a metal blank forming the disk-shaped base element 2 is provided, which may be designed as having several parts. The disk-shaped base element 2 already corresponds essentially to the basic form of the coin 1 to be manufactured. FIG. 2(*a*) shows a top view of the disk-shaped base element 2 for manufacturing a coin 1.

According to the invention, at least one recess or hole 2.2 is then made in the disk-shaped base element 2 and is provided for receiving a flat insert element 4. The form and cross section of the flat insert element 4 are adapted to the form of the recess or the dimensions of the hole 2.2 in the disk-shaped base element 2.

Further, the recess or hole 2.2 can be provided at virtually any position of the disk-shaped base element 2, namely both off-center or in the center area of the coin 1. In a preferred embodiment the flat insert element 4 has a circular cross section, and the thickness of the flat insert element 4 is smaller than the chosen thickness of the disk-shaped base element 2.

According to the invention the flat insert element 4 is furthermore manufactured from a non-conductive material, preferably plastic and at least one RFID identification device 5 is provided in the flat insert element 4. FIG. 2(*b*) shows a top view of the insert element 4 according to the invention with integrated RFID identification device 5 and FIGS. 2(*c*) and (*d*) respectively show a cross section through the disk-shaped base element 2 with an insert element 4 with integrated RFID identification device 5 inserted into the hole or recess 2.2. The surface proportion of the flat insert element 4 in comparison with the surface of the base element 2 of the coin 1 is less than 5%, so that the metal character of the coin 1 is retained also after insertion of the flat insert element 4 into the base element 2.

The RFID identification device 5 is designed for example as an RFID transponder, which consists of an RFID chip 5.1 and an antenna structure 5.2 connected with said chip. FIG. 3 shows a possible embodiment of such an RFID transponder 5. The RFID transponder 5 does not have its own power supply, i.e. it is designed as a passive unit and is therefore active only within the response range of an RFID scanner. The electrical power needed for operation of the RFID transponder 5 or of the RFID chip 5.1 is received in the known manner from the RFID scanner (not depicted in the drawings) via the antenna structure 5.2 and transmitted to the RFID chip 5.1.

To reduce the installed depth of the RFID transponder 5, it can be designed for example in the form of a transponder inlay, i.e. the RFID chip 5.1 and the corresponding antenna structure 5.2 are applied to abuse layer 5.3, for example a thin paper layer or plastic film. The antenna structure 5.2 is normally laminated onto the base layer 5.3 as a full-surface copper or aluminum foil, coated with light-sensitive photoresist and after exposure the areas corresponding to the antenna structure 5.2 are etched free in a caustic bath. Afterwards, the RFID chip 5.1 is placed on the connecting areas of the resulting antenna structure 5.2 and bonded conductively with these areas. The antenna structure 5.2 of the RFID transponder 2 forms for example a dipole or an induction loop. This results in an RFID transponder 5 with an extremely flat design.

In a preferred embodiment in the case of insertion of the insert element 4 in a recess 2.2 of the disk-shaped base element 2 according to FIG. 2(*d*), an electrically conductive shielding layer, in particular a metal foil of aluminum or copper is provided on the side of the base layer 5.3 opposing the antenna structure 5.2, which (shielding layer) approximately corresponds to the spatial dimensions of the antenna structure 5.2. Such an electrically conductive protective layer enables effective shielding of the RFID chip 5.1 or its antenna structure 5.2 from eddy currents caused by the metal base element 2 is possible. The ferromagnetic particles of the electrically conductive shielding layer are oriented so that after being fixed on the base layer 5.3 they are parallel to a magnetic field induced in the antenna structure 5.2 of the RFID transponder 5 and therefore effectively suppress eddy currents which occur.

For manufacturing the flat insert elements 4 the RFID transponder 5 is surrounded by a plastic casing 6 or plastic is molded around the RFID transponder 5, providing effective protection of the RFID transponder 5 from external influences. An injection molding process can be used for this, for example. The plastic used for this preferably has the same color as the base element 2.

The plastic casing 6 can also contain ceramic and/or metal particles. The RFID transponder 5 integrated in the plastic casing 6 or the flat, preferably disk-shaped insert element 4 thus formed is inserted as described below into the recess or hole 2.2 of the base element 2. In a first embodiment variant the diameter $D_E$ of the circular insert element 4 approximately corresponds to the diameter $D_B$ of the recess or hole 2.2, i.e. there is practically no play between the diameter $D_E$ of the insert element 3 and the diameter $D_B$ of the recess or hole 2.2. For insertion of the flat, disk-shaped insert element 4 into the recess or hole 2.2 the insert element 4 is positioned over the recess or hole 2.2 and pressed by means of a pressing process into the recess or hole 2.2. This results in a pressed connection between the base element 2 and the insert element 4. This is followed by embossment of the coin and application of any further protective layers, such as a lacquer or color coating.

According to a second embodiment variant the diameter $D_E$ of the circular insert element 4 is smaller than the diameter $D_B$ of the recess or hole 2.2, i.e. the play between the diameter $D_E$ of the insert element 4 and the diameter $D_B$ of the recess or hole 2.2 is sufficient to insert the insert element 4 without considerable force into the recess or hole 2.2 of the base element 2. For fixing the insert element 4 in the recess or hole 2.2 of the base element 2, at least the base element 2 is deformed by means of a subsequent pressing process so that the diameter $D_B$ of the recess or hole 2.2 decreases, causing the insert element 4 to be fixed in the base element 2. This is followed by embossing of the base element 2 to form the coin 1, as described for the previous embodiment variant.

The base element 2 of the coin 1 prior to the pressing and/or embossing process has a thickness for example of 2.0 to 3.0 mm, preferably 2.25 mm. After the pressing and/or embossing process the thickness is between 1.5 and 2.0 mm, preferably 1.8 mm. The thickness of the flat insert element 4 is significantly less than the thickness of the base element prior to the pressing and/or embossing process, namely between 1.5 and 2.0 mm, preferably approximately 1.8 mm.

Preferably the press die provided for the pressing process is designed so that it has a convex bulge in the direction of the base element 2, so that an outward pressing force is exerted on the base element 2 during the pressing process. During the pressing process at least the base element 2 is impinged with a pressing force between 100 and 250 Pa.

To prevent damage to the RFID identification device 5 integrated in the insert element 4 through the embossing process, the press die can have a recess in the area of the RFID identification device 5, the recess corresponding in form and dimensions to those of the insert element 4. Also, for forming the outer edge 2.1 of the coin 1, the chosen diameter of the press die can be smaller than the diameter of the base element 2.

To increase the bond strength, in a preferred embodiment the outer edge 4' of the insert element 3' and the inner edge 2.2' of the recess or hole 2.2 are designed for creating a form-fitting connection. In particular, according to the exemplary embodiment depicted in FIG. 4, the outer edge 4' of the insert element 3' can be concave and the inner edge 2.2' of the recess or hole 2.2. can be convex, or vice versa.

Likewise, according to the exemplary embodiment depicted in FIG. 5, the form-fitting connection can be achieved as a tongue-and-groove connection, namely for example with the outer edge 4' of the insert element 3' having at least one tongue and the inner edge 2.2' of the recess or hole 2.2 having at least one groove, or vice versa.

The invention was described above based on an exemplary embodiment. It goes without saying that numerous modifications and variations of the invention are possible without abandoning the underlying inventive idea.

Reference List 1 coin
1.1 front
1.2 reverse
1.3 edge of coin
2 base element
2.1 outer ring
2.2 recess or hole
2.2' inner edge
3 embossment
4 insert element
4' outer edge
5 RFID identification device or RFID transponder
5.1 RFID chip
5.2 antenna structure
5.3 base layer
6 plastic casing
$D_E$ diameter of circular insert element
$D_B$ diameter of recess or hole

Having thus described the invention, it is now claimed:

1. A coin consisting of:
    a disk-shaped metal base element (2) and at least one flat insert element (4), which is received in the disk-shaped metal base element (2), wherein the flat insert element (4) is manufactured from a non-conductive material; and,
    at least one RFID identification device (5) is provided in the flat insert element (4) wherein the RFID identification device is formed by an RFID transponder (5), wherein the RFID transponder (5) comprises at least one RFID chip (5.1) and at least one antenna structure (5.2) connected with the chip, and wherein the surface proportion of the flat insert element (4) in comparison with a surface of the base element (2) of the coin (1) is less than 5%.

2. The coin according to claim 1, wherein the at least one disk-shaped metal base element (2) comprises at least one recess or hole (2.2) for receiving the dish-shaped flat insert element (4).

3. The coin according to claim 2, wherein the non-conductive material is plastic and the plastic forms a plastic casing (6) of the RFID identification device (5).

4. The coin according to claim 1, wherein the non-conductive material is plastic and the plastic forms a plastic casing (6) of the RFID identification device (5).

5. The coin according to claim 4, wherein the RFID transponder (5) is designed as a passive unit without its own energy supply.

6. The coin according to claim 4, wherein the RFID chip (5.1) and the corresponding antenna structure (5.2) are applied to a base layer (5.3).

7. The coin according to claim 6, wherein the base layer (5.3) is a thin paper layer or plastic film.

8. The coin according to claim 4, wherein the RFID transponder (5) comprises at least one electrically conductive shielding layer for shielding of the RFID chip (5.1) or its antenna structure (5.2) from eddy currents caused by the metal base element (2).

9. The coin according to claim 1, wherein the flat insert element (4) is pressed together with the base element (2) surrounding flat insert element (4).

10. A method for manufacturing a coin (1) with an integrated RFID identification device (5) comprising a disk-shaped metal base element (2), and at least one flat insert element (4), wherein the RFID identification device is provided in the flat insert element (4) and the RFID identification device is formed by an RFID transponder (5) and the RFID transponder (5) comprises at least one RFID chip (5.1) and at least one antenna structure (5.2) connected with the chip, wherein a surface portion of the flat insert element (4) in comparison with a surface of the base element (2) of the coin (1) is less than 5%, comprising the steps of:
    creating a recess or hole (2.2) in the base element (2);
    inserting a flat insert element (4) with a therein received RFID identification device (5) into the recess or hole (2.2);
    pressing the flat insert element (4) together with the base element (2); and,
    embossing the base element (2) with the flat insert element (4) received in the recess or hole (2.2).

11. The method according to claim 10, wherein the flat insert element (4) is manufactured from a non-conductive material.

12. The method according to claim 11, wherein the non-conductive layer is plastic and the base element (2) is impinged with a pressure between 100 and 250 Pa.

13. The method according to claim 10, wherein the base element (2) is impinged with a pressure between 100 and 250 Pa.

14. The method according to claim 10, wherein the method further comprises the step of:
   applying a protective layer to the top and bottom (1.1, 1.2) of the coin.

15. The method of claim 14, wherein the protective layer is lacquer or a color layer.

16. The method according to claim 10, wherein the method comprises the step of:
   recessing the flat insert element (4) inserted in the base element (2) during the pressing process.

* * * * *

UNITED STATES PATENT AND TRADEMARK OFFICE
CERTIFICATE OF CORRECTION

| | | |
|---|---|---|
| PATENT NO. | : 8,622,311 B2 | Page 1 of 1 |
| APPLICATION NO. | : 13/260887 | |
| DATED | : January 7, 2014 | |
| INVENTOR(S) | : Soheil Hamedani and Gregor Innitzer | |

It is certified that error appears in the above-identified patent and that said Letters Patent is hereby corrected as shown below:

On the Title page of the issued patent, at item (73) Assignees should be:

Muenze Oesterreich AG, Vienna (AT);
Soheil Hamedani, Munich (DE)

Signed and Sealed this
Sixteenth Day of December, 2014

Michelle K. Lee
*Deputy Director of the United States Patent and Trademark Office*